(12) United States Patent
Benthien et al.

(10) Patent No.: US 9,970,190 B2
(45) Date of Patent: May 15, 2018

(54) ROTARY JOINT WITH ACTUATOR, FRAMEWORK CONSTRUCTION KIT AND FRAMEWORK WITH ROTARY JOINTS

(71) Applicant: AIRBUS OPERATIONS GMBH, Hamburg (DE)

(72) Inventors: Hermann Benthien, Hamburg (DE); Matthias Hegenbart, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days. days.

(21) Appl. No.: 15/297,596

(22) Filed: Oct. 19, 2016

(65) Prior Publication Data

US 2017/0114535 A1    Apr. 27, 2017

(30) Foreign Application Priority Data

Oct. 21, 2015    (EP) .................................... 15190861

(51) Int. Cl.
*E04C 3/00*    (2006.01)
*E04B 1/19*    (2006.01)
(Continued)

(52) U.S. Cl.
CPC .............. *E04B 1/1906* (2013.01); *B64C 3/48* (2013.01); *E04B 1/1903* (2013.01); *E04B 1/1909* (2013.01); *F16C 11/04* (2013.01); *F16C 11/0661* (2013.01); *F16C 41/004* (2013.01); *E04B 2001/1957* (2013.01);
(Continued)

(58) Field of Classification Search
CPC .... E04B 1/1906; E04B 1/1903; E04B 1/1909; E04B 2001/1957; F16C 11/04; F16C 11/0661; F16C 2202/36; F16C 2226/60; F16B 7/182; B64C 3/48
See application file for complete search history.

(56) References Cited

U.S. PATENT DOCUMENTS 3,899,221 A    8/1975    Batt
4,161,088 A    7/1979    Gugliotta et al.
(Continued)

FOREIGN PATENT DOCUMENTS

CA    2 237 020 A1    6/1997
DE    37 36 784 A1    5/1989
(Continued)

OTHER PUBLICATIONS

European Search Report for EP 15 190 861.3 dated Aug. 11, 2016.
(Continued)

*Primary Examiner* — Patrick J Maestri
(74) *Attorney, Agent, or Firm* — Jenkins, Wilson, Taylor & Hunt, P.A.

(57) ABSTRACT

A rotary joint includes a socket rod having a socket rod flange with a basically spheroid con-cave bearing surface at a first end, a housing nut encircling the socket rod and having a threaded wrenching head, a ball rod having a basically spheroid convex bearing surface and threaded side walls around the convex bearing surface, and a joint actuator configured to actuate relative movement of the socket rod flange and the ball rod. A diameter of the threaded side walls of the ball rod corresponds to a diameter of the threaded wrenching head of the housing nut.

14 Claims, 3 Drawing Sheets

(51) Int. Cl.
*F16C 11/04* (2006.01)
*B64C 3/48* (2006.01)
*F16C 41/00* (2006.01)
*F16C 11/06* (2006.01)
*F16B 7/18* (2006.01)
*F16C 7/00* (2006.01)

(52) U.S. Cl.
CPC ............... *F16B 7/182* (2013.01); *F16C 7/00* (2013.01); *F16C 2202/36* (2013.01); *F16C 2226/60* (2013.01)

(56) References Cited

U.S. PATENT DOCUMENTS

| | | | |
|---|---|---|---|
| 4,435,023 A * | 3/1984 | Bolner | F02K 9/84 239/265.35 |
| 4,650,361 A | 3/1987 | Seuster | |
| 5,101,607 A | 4/1992 | Staeger | |
| 5,319,577 A | 6/1994 | Lee | |
| 5,711,709 A * | 1/1998 | McCoy | F16B 7/182 464/106 |
| 6,622,447 B1 | 9/2003 | Kessler | |
| 2005/0115186 A1 | 6/2005 | Jensen et al. | |
| 2008/0238249 A1 | 10/2008 | Takahashi | |
| 2010/0054856 A1 * | 3/2010 | Schalla | F16C 7/02 403/408.1 |
| 2010/0083605 A1 | 4/2010 | Wallner | |
| 2017/0130766 A1 | 5/2017 | Benthien et al. | |

FOREIGN PATENT DOCUMENTS

| | | |
|---|---|---|
| DE | 38 00 547 A1 | 7/1989 |
| EP | 0 147 669 A2 | 7/1985 |
| EP | 0 986 685 B1 | 3/2000 |
| EP | 1 358 392 B1 | 11/2003 |
| EP | 2 921 600 A1 | 9/2015 |
| FR | 901 628 A | 8/1945 |
| GB | 2 077 347 A | 12/1981 |
| WO | WO 2014/195868 | 12/2014 |

OTHER PUBLICATIONS

Extended European Search Report for Application No. 15193131 dated Apr. 25, 2016.
Non-Final Office Action for U.S. Appl. No. 15/342,782 dated Sep. 15, 2017.

* cited by examiner

ROTARY JOINT WITH ACTUATOR, FRAMEWORK CONSTRUCTION KIT AND FRAMEWORK WITH ROTARY JOINTS

CROSS-REFERENCE TO RELATED APPLICATION

This application claims priority to European Patent Application EP 15 190 861.3 filed Oct. 21, 2015, the entire disclosure of which is incorporated by reference herein.

TECHNICAL FIELD

The present disclosure pertains to rotary joints, framework construction kits employing rotary joints and frameworks with rotary joints.

BACKGROUND

Beams, joists and frames for construction work, for example in aeronautics, civil engineering or architecture, are designed to withstand bending forces acting perpendicular to the direction of extension of the respective beams. Conventional beams may be implemented as an integral part with flanges at the edges and a web spanning between the flanges. Alternatively, instead of a web, cutter milled struts may be implemented between parallel running longitudinal support bars, thus leading to decreased weight of the beam due to less material being used to form the beam. Such struts may be employed in three-dimensional truss structures, as for example disclosed in documents EP 0 986 685 B1 or EP 1 358 392 B1.

Local load introduction into such beams or frames may, however, lead to torsional moments that are introduced into the attachment joints of the struts with the longitudinal support bars. Such torsional moments may in turn lead to additional moments within the longitudinal support bars that will have to be compensated for by local strengthening means, thereby nullifying some or all of the weight advantages gained.

Document U.S. Pat. No. 6,622,447 B1 discloses a modular structural system for building models and structures, using a plurality of connector hub members with spherical symmetry, and a plurality of strut members with longitudinal symmetry, wherein the strut members are removably engageable with the connector hub members placing the strut members in corresponding radial and tangential positions relative to the connector hub members.

Document CA 2 237 020 A1 and DE 38 00 547 A1 each disclose a set of structural elements for producing supporting structures, using supporting bars and cylindrical connecting elements for insertion heads provided on the end sides of the supporting bars.

Document DE 37 36 784 A1 discloses a node-truss system with rod-shaped elements which are pivotally connected to node bodies. Document U.S. Pat. No. 4,161,088 A discloses a pipe-and-ball truss array in which the outer chord of the truss array comprises an outer hollow pipe element having a structural tee element extending radially outward from the outer surface thereof in a plane normal to the plane in which the deck surface is to be supported on the truss array and an inner rod running through the pipe along the longitudinal axis thereof. A hollow substantially ball-like member, such as a hollow spherical member, is provided which is common to a plurality of truss members which truss members are joined to the spherical member by bolting.

Depending on the specific application, it may be advantageous to mount rods or struts via joints inside a framework in such a way that the orientation and/or the length of the rods or struts within the respective joints may be actively changed and/or adapted. For example, it may be advantageous to provide frameworks with rod- or strut-like connections that are adjustable in length. Alternatively or additionally, it may be advantageous to provide frameworks where the alignment or orientation of rod- or strut-like connections may be adjusted. Such adjustable connections may for example be employed for tolerance compensation of general framework structures or, for example, for moving certain parts of a vehicle with respect to other parts of the vehicle, e.g. aircraft flaps. Other applications, particularly in the aeronautics field, that rely on adjustable framework connections deal for example with adaptable structures, so-called morphing structures, e.g. adaptable aircraft wings with variable geometry and shape that consist of adjustable frameworks. Other morphing aircraft structures encompass wing covers, flaps, nose caps etc.

SUMMARY

It is one idea of the disclosure herein to provide simple and lightweight solutions for constructing frameworks, which compensate additional torsional moments coupled into the joints of the frameworks and which may be actively adapted.

According to a first aspect of the disclosure herein, a rotary joint comprises a socket rod having a socket rod flange with a basically spheroid concave bearing surface at a first end, a housing nut encircling the socket rod and having a threaded wrenching head, a ball rod having a basically spheroid convex bearing surface and threaded side walls around the convex bearing surface, and a joint actuator configured to actuate relative movement of the socket rod flange and the ball rod. A diameter of the threaded side walls of the ball rod corresponds to a diameter of the threaded wrenching head of the housing nut.

According to a second aspect of the disclosure herein, a framework construction kit comprises at least one rotary joint according to the first aspect of the disclosure herein and at least one interconnection strut connected to a second end of the socket rod of the at least one rotary joint or connected to the ball rod of the at least one rotary joint.

According to a third aspect of the disclosure herein, a framework comprises a plurality of rotary joints according to the first aspect of the disclosure herein attached to a plurality of bearing structures, and a plurality of interconnection struts, each connected to a socket rod or a ball rod of the plurality of rotary joints.

A first idea on which the present disclosure is based is to improve the connection points of a framework made up of struts or rods by employing rotary joints inspired by a ball-and-socket type. A stationary connection part is formed by a single protruding ball rod that has a basically (at least partly) spheroid convex outer surface. The side walls of the ball rod around the convex outer surface are provided with a (cylindrically) threaded engagement surface for engagement with a housing nut. A movable connection part is formed by a socket rod that has a basically (at least partly) spheroid concave outer surface. The basic shape of the concave outer surface principally may correspond to the shape of the convex outer surface of the stationary connection part so that both connection parts may be brought in contact with each other and the touching convex and concave outer surface may move in a sliding manner with respect to each other, similar to a ball-and-socket connection.

In order to restrain the movable connection part to not detach from the convex outer surface of the stationary connection part a housing nut is slipped on the socket rod. The housing nut has an inner thread on its inner walls corresponding to the (cylindrically) threaded engagement surface of the stationary connection part. The movable connection part may have a generally tapered shape, i.e. the end portion with the concave outer surface is flanged with respect to the extending rod portion. The opening of the housing nut may have a diameter that is larger than the diameter of the extending rod portion, but smaller than the diameter of the flanged end portion. Therefore, when the housing nut is threadingly engaging the threaded engagement surface of the stationary connection part, the housing nut clamps the flanged end portion between the rim of the housing nut opening and the stationary connection part so that the movable connection part will be secured against detachment from the stationary connection part, i.e. a linear movement of the movable connection part in the direction of the extending rod portion away from the stationary connection part will be mechanically restrained.

Along the contacting surfaces of the stationary connection part ("ball" part) and the movable connection part ("socket" part) a swiveling motion of the socket rod with respect to the attached structure of the stationary connection part may be realized. A lateral moment on the strut coupled to the socket rod with respect to the contacting surfaces of the rotary joint will lead to a shifting movement of the socket rod along the outer surface of the stationary connection part. Thus, any bending moment acting perpendicular to the orientation of the strut/socket rod will vanish with respect to the rotary joint due to the compensating sliding movement of the movable connection part with respect to the stationary connection part. This means in turn that the rotary joint will be essentially free of any bending moments that would otherwise be brought into the rotary joints. The axes of struts coupled to such rotary joints will always be oriented towards the center of the rotary joint, thereby balancing out the rotary joint optimally under any loading situation on the struts.

A second idea on which the present disclosure is based is to improve the connection points of a framework made up of struts or rods by providing rotary joints with actuators that may be utilized to actively adjust the framework or at least parts of the framework. For this, the joint actuators are configured to actuate relative movement of the socket rod flange, and thus of the socket rod itself, and the ball rod. Conventional rotary joints often only provide a one-dimensional swiveling degree of freedom. In contrast, the rotary joint according to present disclosure principally may provide freedom of movement in two dimensions. Hence, the number of rotary joints may be reduced by half. Further, the present disclosure provides the opportunity to implement the actuation at a short distance to the center of rotation (of the swiveling motion). The actuation may be particularly provided directly at the socket rod flange within the housing nut. By implementing actuators in at least some of the rotary joints of a framework it is possible to design frameworks that may be actively (re-)adjusted. For example, rods or struts mounted to such rotary joints may be shifted in orientation independent of each other. Connecting a plurality of rods or struts with such rotary joints in frameworks of two or three dimensions opens up the possibility to create complex fully adaptable (morphing) structures with variable geometry and shape.

According to an embodiment of the rotary joint, the joint actuator is arranged in between the housing nut and the socket rod flange. Hence, the load of the actuator may be introduced directly within the housing nut at a short distance to the center of the rotary joint. The joint actuator may be consequently integrated within the rotary joint and accommodated within the housing nut.

According to an embodiment of the rotary joint, the joint actuator is configured to actuate a swiveling movement of the socket rod and the socket rod flange with respect to the ball rod. Thus, the socket rod may be actively swiveled out of its baseline position. The joint actuator may be configured similar to a linear actuator so that the socket rod and the socket rod flange may be swiveled into one fixed swiveling direction. However, the joint actuator may also be configured in such a way that the swiveling direction may be arbitrarily set within a two dimensional plane corresponding to the range of movement of the socket rod flange within the rotary joint.

According to an embodiment of the rotary joint, the joint actuator is configured to actuate relative movement of the socket rod flange and the ball rod by sliding the socket rod flange with its concave bearing surface over the convex bearing surface of the ball rod.

According to an embodiment of the rotary joint, the joint actuator is configured to freely move the socket rod flange with its concave bearing surface within a part spherical surface over the convex bearing surface of the ball rod. In this embodiment the socket rod flange and the socket rod cannot be only actively swiveled into one or several directions, but the range of movement encompasses active movement on a part spherical surface. This embodiment offers outstanding flexibility for actively actuating an adjustable framework comprising a plurality of such rotary joints.

According to an embodiment of the rotary joint, the joint actuator is configured as a ring actuator encircling the socket rod flange. A ring actuator is one advantageous embodiment providing actuation for spherical motion of the socket rod flange and the socket rod.

According to an alternative embodiment of the rotary joint, the joint actuator comprises at least one linear actuator. Linear actuators may be employed to actuate swivelling motion into one (one linear actuator) or several (more than one linear actuator) directions.

According to an embodiment of the rotary joint, the joint actuator is configured to convert electrical energy, magnetic energy, thermal energy, hydraulic energy and/or pneumatic energy into motion. In one advantageous embodiment, a cylinder or fluid motor may be employed that uses hydraulic power or pressure to facilitate mechanical operation. In another advantageous embodiment, energy formed by vacuum or compressed air may be converted at high pressure into either linear or rotary motion. A MEMS ("microelectromechanical systems") thermal actuator may be used for example, wherein a micromechanical device generates motion by thermal expansion amplification. Actuators applying thermal or magnetic energy tend to be compact, lightweight, economical and to achieve high power density. These actuators may use shape memory materials (SMM), such as shape memory alloys (SMA) or magnetic shape-memory alloys (MSMA).

According to an embodiment of the rotary joint, the joint actuator is an electric, mechanical or electro-mechanical actuator.

According to an embodiment of the rotary joint, the actuator comprises a piezoelectric motor. Piezoelectric motors may be provided in very small and energy-saving configurations making use of the converse piezoelectric effect whereby linear or rotary motion is generated through acoustic or ultrasonic vibrations.

According to an embodiment of the rotary joint, the piezoelectric motor comprises a traveling-wave motor, an inchworm motor, a rectangular four-quadrant motor or a slip-stick motor or the like. Inchworm motors may be utilized for example for actuating linear motion, whereas a traveling-wave motor may be used for creating rotary/spherical motion. These motors may be configured in very small configurations.

According to an embodiment of the rotary joint, the housing nut has a nut hole on the opposite side of the threaded wrenching head, the diameter of the nut hole being larger than the diameter of the socket rod, but smaller than the diameter of the socket rod flange. This way, the socket rod flange is given enough leeway to swivel along the ball rod bearing surface, but is not able to detach from the ball rod perpendicular to its surface.

According to an embodiment of the rotary joint, the curvature of the concave bearing surface of the socket rod flange corresponds to the curvature of the convex bearing surface of the ball rod. This enables the implementation of a smooth contact between the two movable parts, thereby reducing the inner friction within the joint.

BRIEF DESCRIPTION OF THE DRAWINGS

The disclosure herein will be explained in greater detail with reference to exemplary embodiments depicted in the drawings as appended.

The accompanying drawings are included to provide a further understanding of the present disclosure and are incorporated in and constitute a part of this specification. The drawings illustrate the embodiments of the present disclosure and together with the description serve to explain the principles of the disclosure herein. Other embodiments of the present disclosure and many of the intended advantages of the present disclosure will be readily appreciated as they become better understood by reference to the following detailed description. The elements of the drawings are not necessarily to scale relative to each other. In the figures, like reference numerals denote like or functionally like components, unless indicated otherwise.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION

Although specific embodiments are illustrated and described herein, it will be appreciated by those of ordinary skill in the art that a variety of alternate and/or equivalent implementations may be substituted for the specific embodiments shown and described without departing from the scope of the present disclosure. Generally, this application is intended to cover any adaptations or variations of the specific embodiments discussed herein.

Figure 1A:
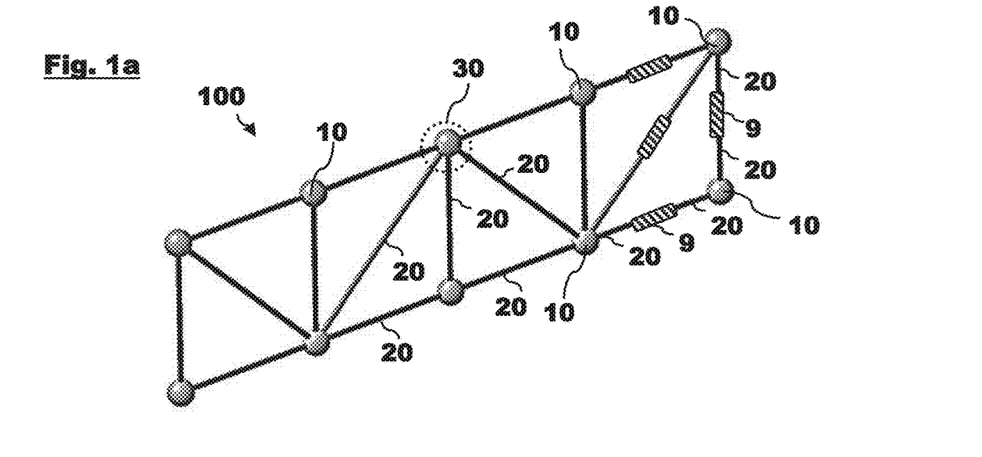
FIG. 1a schematically illustrates a framework with rotary joints according to an embodiment of the disclosure herein.

FIG. 1a schematically illustrates a framework 100 with rotary joints 10 according to an embodiment of the disclosure herein. The framework 100 comprises a multitude of laterally and diagonally running rods or struts 20 which may be interconnected among each other at joint regions 30 via rotary joints 10. Each of the joint regions 30 may have one or several rotary joints 10 each being connected to end portions of the struts/rods 20 reaching into the particular joint region 30. Each strut 20 may be connected to a socket rod 2 or a ball rod 6 of one of the rotary joints 10, as will be explained further below. The rotary joints 10 may be provided with joint actuators 11 according to embodiments of the disclosure herein, configured to actuate relative movement of the socket rod 2 and the ball rod 6 and thus relative movement of the connected struts 20 within the framework 100. In principal, pairs of rotary joints 10 may also be length-adjustably connected to each other via a pair of interconnecting rods or struts 20 and a stepper drive 9 positioned in between the struts 20. Each pair of struts 20 may be mounted to the respective stepper drive 9 in such a way that the length of the two struts 20 forming a connection between two rotary joints 10 is adjustable by the stepper drive 9 and hence can be extended or shortened. The framework 100 may have a generally two-dimensional layout, i.e. the struts 20 and joints 10 are substantially lying in one plane of extension which may be flat or arcuate. In the exemplary case of FIG. 1a the framework 100 takes on the shape of a frame having two substantially parallel beams (running from bottom left to top right in the drawing) formed by a first subset of the interconnecting struts 20 and diagonally staggered crossbeams between the two substantially parallel beams formed by a second subset of the interconnecting struts 20.

The framework 100 may also have a generally three-dimensional layout, i.e. for each first plane of extension defined by a subset of struts 20, another subset of struts 20 is connected to rotary joints 10 in a manner that defines at least one further second plane of extension being arranged under a non-zero angle with respect to the first plane of extension. Rotary joints 10 as disclosed hereinforth generally denote spheroid joints or socket type joints where a stationary part having a basically spheroid or at least partly spheroid convex outer bearing surface is in sliding contact with a basically spheroid least partly spheroid concave counter-bearing surface of a hinged part. The stationary part may be a joint member, such as a bracket, fixture or holder, while the hinged and movable part may be a strut, rod or other truss element, such as a strut 20 as shown in FIG. 1a.

The number of struts 20 being interconnected in each joint region 30 may vary and may in particular be not limited to the explicit number of two, three or five as exemplarily shown in FIG. 1*a*. Specifically, the number of interconnecting struts 2 at each joint region 30 may take on any number greater than one. To that end, the rotary joints 10 employed at each joint region 30 may have a number of interconnection assemblies that is at least equal or greater than the number of interconnecting struts 20. Moreover, the kind, type and specific design of the rotary joints 10 may vary depending on the particular joint region 30 they are employed at.

Generally, a set of rotary joints 10 and a set of interconnecting struts 20 may form a framework construction kit, which may be used to construct different frameworks of varying extension, size, shape and complexity. Thus, while it may be favorable to use as few different types of rotary joints 10 and as few different types of interconnecting struts 20 as possible to guarantee high flexibility in framework design and low implementation effort, it may as well be possible to use more different types of rotary joints 10 and/or interconnecting struts 20 in order to specifically be able to tailor the framework construction kit to the particular needs and constraints of the framework and its intended field of application.

The frameworks and rotary joints disclosed hereinforth may be used in a lot of applications, including—but not limited to—constructions of wings in aircraft, general aircraft structures, other vehicles, civil engineering, applications for children's toys and similar. A particular application pertains to the construction of frameworks in aircraft. Such frameworks include, for example, connection rods for fastening a component on the fuselage structure and/or for creating adjustable or morphing aircraft structures, like wing covers, flaps, nose caps etc.

Conventional connection rods often have a central strut portion between two end portions used to interconnect the connection rod between two joints or brackets. Conventional rods may have a hollow-cylindrical central portion that may taper towards the end regions. The end regions may have a shank and eyes arranged at shank ends on both sides for connecting the rod to the fuselage structure. In order to link the rod to the structure of the aircraft, a clamp or a forked bracket may be attached to the structure. The clamp (or bracket) may have a bore which may align with the eye of a shank end so that a bolt introduced through the bore and the eye pivotably couples the rod to the clamp (or bracket).

In contrast to such conventional rods, the linking mechanism of struts 20 as illustrated herein greatly reduces the number of individual parts used for mechanically linking the struts 20 to a structure or framework, such as the framework 100 in FIG. 1*a*. In addition, the linking mechanism according to the present disclosure offers the possibility to adjust the orientation and/or alignment of rod/strut connections within a framework 100 or structure and thus makes it possible to build flexible frameworks 100 that can be adapted to the needs of the specific use case. In particular, the system according to the present disclosure offers a flexible and simple way of constructing frameworks 100 that may be actively adapted or adjusted, e.g. as part of morphing aircraft structures. The joint actuators 11 of the rotary joints 10 may be used to adapt the geometry and shape of aircraft structures, like wings for example. Additionally, the usage of less individual parts for the struts 20 and the rotary joints 10 requires less effort in positioning the struts 20 with respect to the brackets or clamps to which are to be fastened. This, in turn, leads to lower manufacturing costs and higher throughput in constructing frameworks.

Figure 1B:
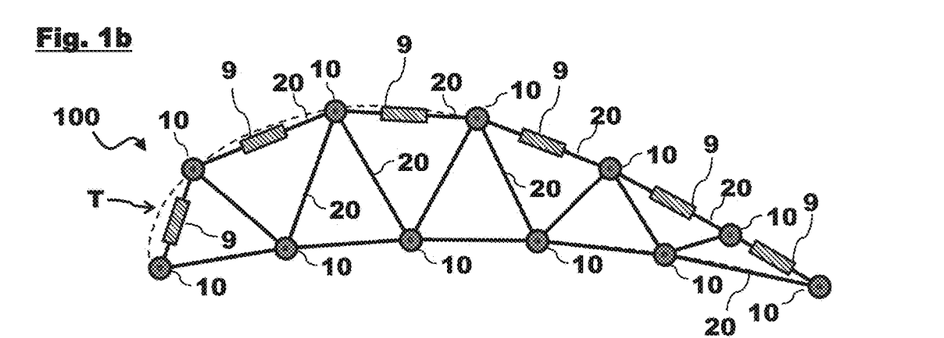
FIG. 1b schematically illustrates a framework with rotary joints according to another embodiment of the disclosure herein.

As another variant of the framework 100, FIG. 1*b* shows two main beams formed by a first subset of the struts 20, the two beams being interconnected by two end rotary joints 10 at their respective end sections. By interconnecting the ends of the beams, the beams take on a roughly arcuate shape. When the number of struts 20 in both beams differs, or when the total length of struts 20 in both beams differs, the framework 100 may have a two-dimensional outer profile T that may for example be matched to a cross section of a wing profile. Of course, other profiles for different applications may be approximated as well. Between the two beams, diagonally staggered crossbeams are formed by a second subset of the struts 20.

The two-dimensional outer profile T may for example be approximated by using actuators such as stepper drives 9 in the upper beam that iteratively may adjust the length of the constituting struts 20 of the upper beam to match the outer profile T as closely as possible. The stepper drives 9 may configured to adjust the length of the struts 20.

Multiple of the two-dimensional frameworks 100 of FIG. 1*b* may be combined to a three-dimensional framework 100. "Slices" of two-dimensional frameworks 100 may be interconnected by a third subset of struts 20 between corresponding rotary joints 10, which third subset of struts 20 may be equipped with stepper drives 9 as well. Thereby, a complete three-dimensional out wing profile T may be approximated with a framework structure.

The stepper drives 9 may be preset to static values that approximate the wing profile T once. After that the stepper drives 9 do not necessarily need to be controlled any more since the lengths of the struts 20 have been adjusted optimally already. Alternatively or additionally, the framework however may be subject to varying stress or load conditions that require dynamically re-adjusting the stepper drives 9 over time depending on those varying external stress or load conditions.

Each stepper drive 9 may comprises a female-threaded duct, which may engaged, at a first stepper drive end portion, with a threaded shank of one strut 20, and at a second stepper drive end portion, with a threaded shank of another strut 20. For adjusting the length of the connection of two rotary joints 10, each stepper drive 9 may be configured to adjust the length of the connection by either driving out both struts 20 and thus extend the length of the connection between both rotary joints 10 or driving in both struts 20 and hence shorten the length of the connection between both rotary joints 10. The adjustment of the connection length can be done either manually (e.g. by simply rotating a mechanical stepper drive 9) or, for example, automatically with an appropriately configured electrically operated stepper drive/ motor 9.

Figure 2:
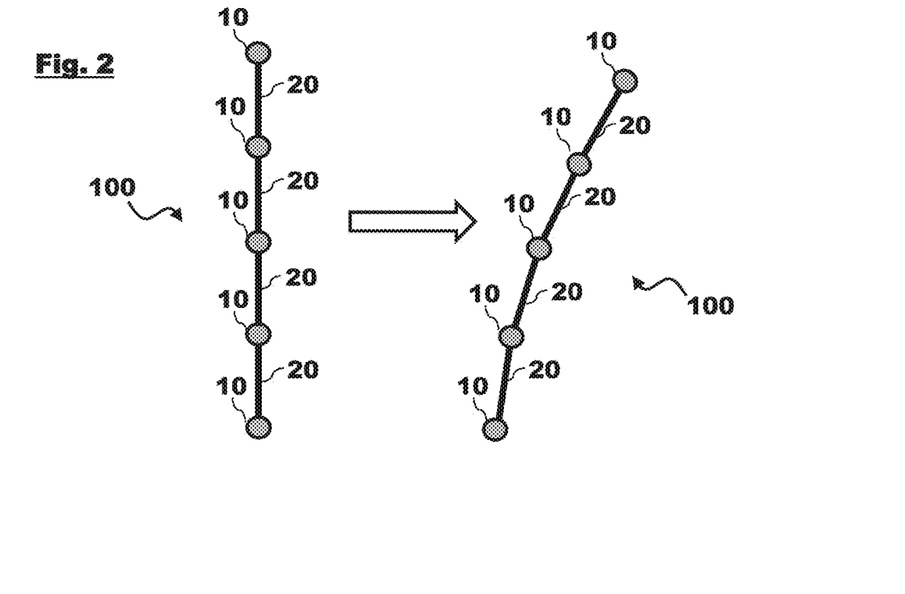
FIG. 2 schematically illustrates a framework with rotary joints according to yet another embodiment of the disclosure herein.

As another variant of the framework 100, FIG. 2 on the left shows one exemplary beam formed by a subset of the struts 20, each pair of struts 20 being interconnected by one rotary joint 10 at their respective ends. All rotary joints 10 are in this case provided with joint actuators 11 according to embodiments of the disclosure herein. In contrast to the framework 100 of FIGS. 1*a* and 1*b*, the framework shown in FIG. 2 does not employ stepper drives 9.

Each strut 20 may be connected to a socket rod 2 or a ball rod 6 of one of the rotary joints 10, as will be explained further below. The joint actuators 11 are configured to actuate relative movement of the socket rod 2 and the ball rod 6 and thus relative movement of the connected struts 20 within the framework 100. Consequently, the shape of the framework 100 can be actively adapted by using the joint actuators 11 to move the struts 20 relative to each other. The left side of FIG. 2 shows the framework 100 in a straight orientation, wherein all rotary joints 10 are configured with the connected struts 20 in a baseline position. The right side of FIG. 2 on the other hand depicts the same framework 100 after the struts 20 have been moved out of the baseline position within each respective rotary joint 10. By actuating each rotary joint 10 independent of each other, the shape or geometry of the framework 100 can be changed in a flexible way.

The framework 100 of FIG. 2 may hence be adjusted in shape without using any stepper drives 9. Stepper drives 9 are thus not required in case of the present disclosure to create simple, lightweight and flexible frameworks that can be actively adapted. Any change of form and shape of the framework 100 can be can be directly realized through actuation of the rotary joints 10 and thus of the struts 20. By using the rotary joints 10 with joint actuators 11 according to the present disclosure morphing structures with three-dimensional change in shape can be realized in a straightforward way. For example, frameworks 100 may be dynamically readjusted according to varying stress or load conditions by actuating the joint connections within the framework 100 over time depending on those varying external stress or load conditions. For example, the framework 100 depicted in FIG. 1*b* may be equally well constructed without using any stepper drives 9 but by instead providing some or all of the rotary joints 10 with joint actuators 11 according to the present disclosure.

Figure 3A:
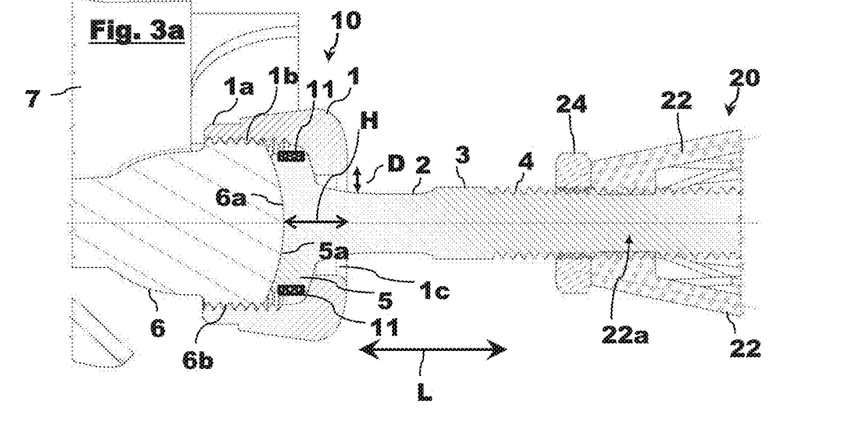
FIG. 3a schematically illustrates a cross-sectional view of a rotary joint with attached strut according to another embodiment of the disclosure herein with the socket rod being arranged in a baseline position.
Figure 3B:
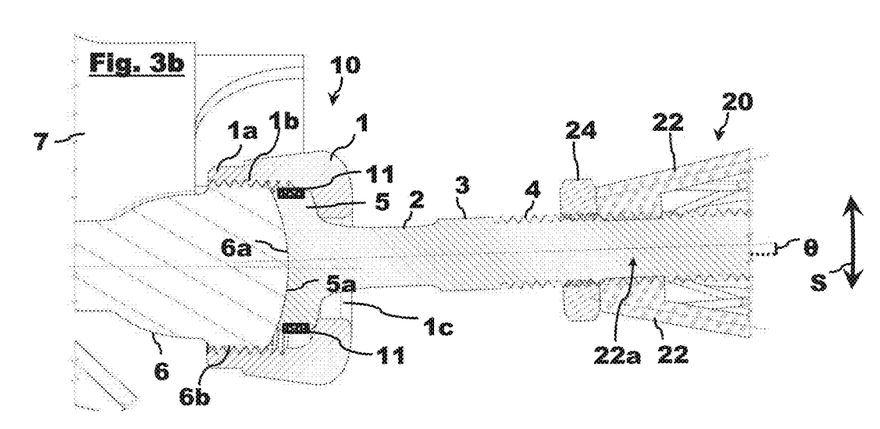
FIG. 3b schematically illustrates a cross-sectional view of the rotary joint of FIG. 3a with the socket rod swiveled out of its baseline position.
Figure 4:
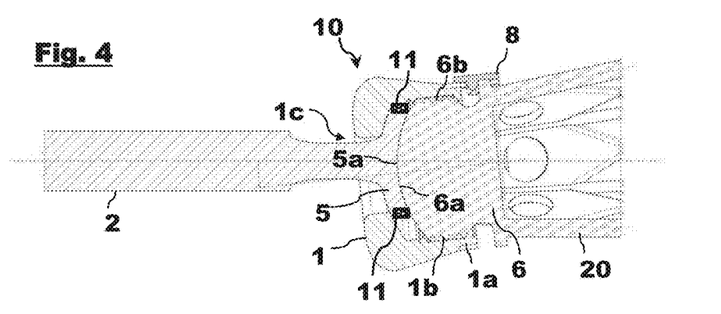
FIG. 4 schematically illustrates a cross-sectional view of a rotary joint with attached strut according to yet another embodiment of the disclosure herein with the socket rod swiveled out of its baseline position.

FIG. 3*a* schematically illustrates a cross-sectional view of one rotary joint 10 with attached strut 20 according to an embodiment of the disclosure herein with the socket rod 2 being arranged in a baseline position. FIG. 3*b* schematically illustrates a cross-sectional view of the rotary joint 10 of FIG. 3*a* with the socket rod 2 swiveled out of its baseline position. FIG. 4 schematically illustrates a cross-sectional view of a rotary joint 10 with attached strut 20 according to an alternative embodiment of the disclosure herein with the socket rod 2 swiveled out of its baseline position.

The rotary joint 10 of FIGS. 3*a* and 3*b* comprises a socket rod 2, for example a generally cylindrical socket rod 2 with a tapered middle portion. At a first end of the socket rod 2—the left hand side in FIG. 3*a*—the socket rod 2 has a socket rod flange 5 attached thereto. The socket rod flange 5 may be integrally fabricated with the middle portion of the socket rod 2. The socket rod flange 5 has a basically (at least partly) spheroid concave bearing surface 5*a* at a first end, i.e. the bearing surface 5*a* has a curvature where the radius of the curvature lies outside the socket rod 2.

A generally cylindrical housing nut 1 encircles the socket rod 2 and has a threaded wrenching head 1*a*. The threaded wrenching head 1*a* may have an angular contour, for example a hex contour for a wrenching tool to grip thereon and exert a torque onto the housing nut 1. The housing nut 1 has an opening on the flange side of the socket rod 2 the diameter of which exceeds the diameter of the opening on the opposite side of the housing nut 1. In other words, the housing nut 1 has a nut hole 1*c* on the opposite side of the threaded wrenching head 1*a*, the diameter D of which is smaller than the diameter of the opening of the threaded wrenching head 1*a*. The threaded wrenching head 1*a* has a female-thread inner thread 1*b* formed on its inner walls.

The nut hole 1*c* is larger in diameter than the diameter of the socket rod 2 so that the housing nut 1 is able to be moved along a slip path L along the axis of extension of the socket rod 2. The socket rod flange 5, however, is formed with a larger diameter than the diameter D of the nut hole 1*c* so that the housing nut 1 may not slip off the socket rod 2 over the socket rod flange 5.

The rotary joint 10 further comprises a ball rod 6 that has a ball rod head with threaded side walls 6*b* and a basically (at least partly) spheroid convex bearing surface 6*a*, i.e. the bearing surface 6*a* has a curvature where the radius of the curvature lies inside the ball rod 6. The diameter of the threaded side walls 6*b* of the ball rod 6 corresponds to a diameter of the threaded wrenching head 1*a* of the housing nut 1. The curvature of the concave bearing surface 5*a* of the socket rod flange 5 particularly corresponds to the curvature of the convex bearing surface 6*a* of the ball rod 6, so that a smooth contacting area between the socket rod 2 and the ball rod 6 is guaranteed. For assembly of the rotary joint 10, the bearing surfaces 5*a* and 6*a* of the socket rod 2 and ball rod 6, respectively are brought into contact. Then, the housing nut 1 is guided over the socket rod flange 5 and threadingly engaged with the threaded side walls 6*b* of the ball rod 6. This provides a housing of the socket rod flange 5 between the inner hollow of the housing nut 1 and the ball rod 6.

The housing nut 1 is then tightened up to a point where the socket rod flange 5 is securely held in contact with the ball rod 6 at the respective contacting surfaces 5*a* and 6*a*. However, the tightening of the housing nut 1 is chosen in such a way that the socket rod flange 5 and the ball rod head are still able to move in sliding or swiveling movement S with respect to each other, as shown in FIG. 3*b*. The swiveling movement S will displace the socket rod 5 out of axis of the ball rod 6 by a swiveling angle θ. The maximum possible swiveling angle θ will be determined by the ratio between the nut hole diameter D and the height H of the housing nut 1.

The rotary joint 10 further comprises a joint actuator 11 configured to actuate relative movement of the socket rod flange 5, and thus of the socket rod 2 as well as the strut 20 connected thereto, and the ball rod 6. The joint actuator 11 may thus be configured to actuate a swiveling movement S of the socket rod 2 with respect to the ball rod 6. The joint actuator 11 will be detailed further below in conjunction with FIGS. 5*a* and 5*b*.

The ball rod 6 may generally be attached to any bearing structure 7, such as a bracket, a holder, a support beam or any other suitable structure. It may also be possible to provide more than one ball rod 6 with different directions of extension to the same bearing structure 7 in order to provide for an interconnection node for multiple struts 20.

The socket rod 2 of FIGS. 3*a* and 3*b* may have a threaded shank with a socket rod thread 4. The threaded shank may be located on an end portion opposite to the end portion having the socket rod flange 5. In the middle portion of the socket rod 5, a wrenching contour 3 may be arranged on the circumference of the socket rod 2. The wrenching contour 3 may for example be a series of angled surfaces, such as a hex, for wrenching tools to grip on the socket rod 2 and exert a torque on the socket rod 2 around its main axis of extension.

The threaded shank may be used for connecting the socket rod 2 to a strut 20. The strut 20 may for this purpose have a corresponding female-threaded socket rod duct 22*a* located at a first strut end portion. The female-threaded socket rod duct 22*a* may be threadingly engaged with the threaded shank of the socket rod 2. Additionally, a strut wrenching head 24 may be provided on the end portion of the strut 20 in order to have structure for exerting a countering force to the torque exerted on the socket rod wrenching contour 3 when engaging the socket rod 2 with the strut 20.

The threaded shank of the socket rod 20 advantageously allows for adjusting the distance by which the socket rod 2 protrudes from the strut 20, thereby enabling a framework constructed with rotary joints 10 and struts, such as a framework 100 of FIGS. 1a and 1b, to be flexibly designed with regard to strut lengths between different interconnecting nodes.

The struts 20 themselves may comprise a trussed beam, for example built up with an isometric framework. Those trussed beams may for example include a plurality of substantially longitudinally running chord members distributed around a central axis. A plurality of web members may be provided, spanning between the chord members in zig-zag, diagonal or otherwise grid-like manner. The central diameter of the trussed beams may in particular be larger than the diameter of the socket rods 2. Thus, it may be possible to provide the end portions of the struts 20 as tapered regions with chord members 22 tapering from the central portion towards the ends of the strut 20.

FIG. 4 schematically illustrates a cross-sectional view of a rotary joint 10 with attached strut 20 according to an alternative embodiment of the disclosure herein with the socket rod 2 swiveled out of its baseline position.

Similar to the rotary joints 10 of FIGS. 3a and 3b, the rotary joint 10 of FIG. 7 comprises a socket rod 2, for example a generally cylindrical socket rod 2 with a tapered middle portion. At a first end of the socket rod 2—the right hand side in the FIG. 4—the socket rod 2 has a socket rod flange 5 attached thereto. The socket rod flange 5 may be integrally fabricated with the middle portion of the socket rod 2. The socket rod flange 5 has a basically (at least partly) spheroid concave bearing surface 5a at a first end, i.e. the bearing surface 5a has a curvature where the radius of the curvature lies outside the socket rod 2.

The rotary joint 10 of FIG. 4 further comprises a ball rod 6 that has a ball rod head with threaded side walls 6b and a basically (at least partly) spheroid convex bearing surface 6a, i.e. the bearing surface 6a has a curvature where the radius of the curvature lies inside the ball rod 6. The diameter of the threaded side walls 6b of the ball rod 6 corresponds to a diameter of the threaded wrenching head 1a of the housing nut 1. The curvature of the concave bearing surface 5a of the socket rod flange 5 particularly corresponds to the curvature of the convex bearing surface 6a of the ball rod 6, so that a smooth contacting area between the socket rod 2 and the ball rod 6 is guaranteed. For assembly of the rotary joint 10 in FIG. 4, the bearing surfaces 5a and 6a of the socket rod 2 and ball rod 6, respectively are brought into contact. Then, the housing nut 1 is guided over the socket rod flange 5 and threadingly engaged with the threaded side walls 6b of the ball rod 6. This provides a housing of the socket rod flange 5 between the inner hollow of the housing nut 1 and the ball rod 6.

In contrast to the rotary joints 10 of FIGS. 3a and 3b, however, the rotary joint 10 of FIG. 4 has its ball rod 6 connected to a strut 20. For example, the ball rod 6 may be formed integrally at an end portion of the strut 20. When the housing nut 1 is threadingly engaged with the threaded side walls 6b of the ball rod 6, a clamping bracket 8, for example an annular clamping bracket sleeving the ball rod 6 and the end portion of the strut 20 at least partially, may be affixed to the rotary joint 10. This further secures the positioning of the housing nut 1 with respect to the strut 20 and prevents the housing nut 10 from accidentally coming loose due to vibrations or other mechanical strain.

The rotary joint 10 further comprises a joint actuator 11 configured to actuate relative movement of the socket rod flange 5, and thus of the socket rod 2 connected thereto, and the ball rod 6, and thus of the socket rod 2 attached thereto. The joint actuator 11 may thus be configured to actuate a swiveling movement S of the socket rod 2 with respect to the ball rod 6. The joint actuator 11 will be detailed further below in conjunction with FIGS. 5a and 5b.

Figure 5A:
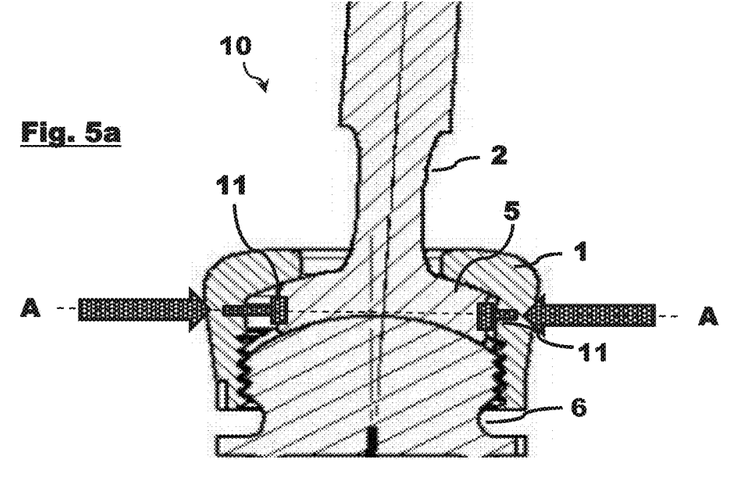
FIG. 5a schematically illustrates a detailed cross-sectional view of the rotary joint of FIG. 4.
Figure 5B:
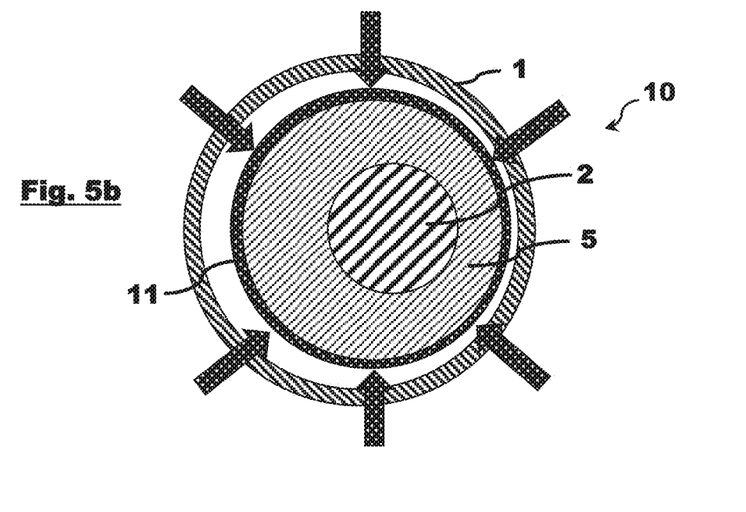
FIG. 5b schematically illustrates a detailed cross-sectional view of the rotary joint of FIG. 5a along the line A-A.

FIG. 5a schematically illustrates a detailed cross-sectional view of the rotary joint 10 of FIG. 4. FIG. 5b schematically illustrates a detailed cross-sectional view of the rotary joint 10 of FIG. 5a along the line A-A.

The rotary joint 10 comprises a joint actuator 11 configured to actuate relative movement of the socket rod flange 5 and the ball rod 6. In this exemplary embodiment the joint actuator 11 is arranged in between the housing nut 1 and the socket rod flange 5. The joint actuator 11 actuates relative movement of the socket rod flange 5 and the ball rod 6 by sliding the socket rod flange 5 with its concave bearing surface 5a over the convex bearing surface 6a of the ball rod 6. With this a swiveling movement of the socket rod 2 and the socket rod flange 5 may be triggered with respect to the ball rod 6 (indicated by arrows in FIGS. 5a and 5b). However, in this particular embodiment the joint actuator 11 is configured as a ring actuator encircling the socket rod flange 5, so that it can move the socket rod flange 5 with its concave bearing surface 5a within a part spherical surface over the convex bearing surface 6a of the ball rod 6. This enables maximal freedom of movement of the socket rod 2 (the socket rod flange 5) within the rotary joint 10. Hence, employing rotary joints 10 like this it is possible to construct fully adaptable, morphing frameworks 100 (like the one depicted in FIG. 2) of a plurality of struts 20 and rotary joints 10, wherein each strut 20 may either be connected to a socket rod 2 or a ball rod 6 of one rotary joint 10.

The joint actuator 11 may be configured to convert electrical energy into motion. The joint actuator 11 may for example be an electro-mechanical actuator comprising one or several piezoelectric motors, like for example a traveling-wave motor, an inchworm motor or a slip-stick motor or the like. However, depending on the particular size of the joint system and the corresponding framework and its particular needs and constraints as well as its intended field of application, a different technology and geometric configuration may be chosen for the joint actuator 11. Instead, the joint actuator 11 may be configured as a linear actuator that is able to swivel the socket rod 2 (socket rod flange 5) only within a single, fixed direction. Alternatively, the joint actuator 11 may comprises several linear actuators so that several swiveling directions may be realized. Correspondingly, different actuator technologies may be advantageous. For some applications, hydraulic or pneumatic actuators may be preferred, where hydraulic or pneumatic pressure is transformed into linear or rotary motion.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the disclosure herein and its practical applications, to thereby enable others skilled in the art to best utilize the disclosure herein and various embodiments with various modifications as are suited to the particular use contemplated. Many other examples will be apparent to one skilled in the art upon reviewing the above specification.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A rotary joint comprising:
   a socket rod comprising a socket rod flange with a basically spheroid concave bearing surface at a first end;
   a housing nut encircling the socket rod and comprising a threaded wrenching head;
   a ball rod comprising a basically spheroid convex bearing surface and threaded side walls around the convex bearing surface; and
   a joint actuator configured to actuate relative movement of the socket rod flange and the ball rod;
   a diameter of the threaded side walls of the ball rod corresponding to a diameter of the threaded wrenching head of the housing nut,
   wherein the joint actuator is arranged in between the housing nut and the socket rod flange.

2. The rotary joint of claim 1, wherein the joint actuator is configured to actuate a swiveling movement of the socket rod and the socket rod flange with respect to the ball rod.

3. The rotary joint of claim 1, wherein the joint actuator is configured to actuate relative movement of the socket rod flange and the ball rod by sliding the socket rod flange with its concave bearing surface over the convex bearing surface of the ball rod.

4. The rotary joint of claim 1, wherein the joint actuator is configured to freely move the socket rod flange with its concave bearing surface within a part spherical surface over the convex bearing surface of the ball rod.

5. The rotary joint of claim 1, wherein the joint actuator is configured as a ring actuator encircling the socket rod flange.

6. The rotary joint of claim 1, wherein the joint actuator comprises at least one linear actuator.

7. The rotary joint of claim 1, wherein the joint actuator is configured to convert electrical energy, magnetic energy, thermal energy, hydraulic energy and/or pneumatic energy into motion.

8. The rotary joint of claim 1, wherein the joint actuator is an electric, mechanical or electro-mechanical actuator.

9. The rotary joint of claim 8, wherein the actuator comprises a piezoelectric motor.

10. The rotary joint of claim 9, wherein the piezoelectric motor comprises a traveling-wave motor, an inchworm motor, a rectangular four-quadrant motor or a slip-stick motor.

11. The rotary joint of claim 1, wherein the housing nut has a nut hole on the opposite side of the threaded wrenching head, a diameter of the nut hole being larger than a diameter of the socket rod, but smaller than a diameter of the socket rod flange.

12. The rotary joint of claim 1, wherein a curvature of the concave bearing surface of the socket rod flange corresponds to a curvature of the convex bearing surface of the ball rod.

13. A framework construction kit, comprising:
   at least one rotary joint comprising:
      a socket rod having a socket rod flange with a basically spheroid concave bearing surface at a first end;
      a housing nut encircling the socket rod and having a threaded wrenching head;
      a ball rod having a basically spheroid convex bearing surface and threaded side walls around the convex bearing surface; and
      a joint actuator configured to actuate relative movement of the socket rod flange and the ball rod;
      a diameter of the threaded side walls of the ball rod corresponding to a diameter of the threaded wrenching head of the housing nut; and
   at least one interconnection strut connected to a second end of the socket rod of the at least one rotary joint or connected to the ball rod of the at least one rotary joint,
   wherein the joint actuator is arranged in between the housing nut and the socket rod flange.

14. A framework, comprising:
   a plurality of rotary joints comprising:
      a socket rod having a socket rod flange with a basically spheroid concave bearing surface at a first end;
      a housing nut encircling the socket rod and having a threaded wrenching head;
      a ball rod having a basically spheroid convex bearing surface and threaded side walls around the convex bearing surface; and
      a joint actuator configured to actuate relative movement of the socket rod flange and the ball rod;
      a diameter of the threaded side walls of the ball rod corresponding to a diameter of the threaded wrenching head of the housing nut,
      the rotary joints being attached to a plurality of bearing structures; and
   a plurality of interconnection struts, each connected to a socket rod or a ball rod of the plurality of rotary joints,
   wherein the joint actuator is arranged in between the housing nut and the socket rod flange.

* * * * *